US010320999B2

(12) United States Patent
Taniguchi

(10) Patent No.: US 10,320,999 B2
(45) Date of Patent: Jun. 11, 2019

(54) IMAGE FORMING APPARATUS, IMAGE FORMING SYSTEM, AND IMAGE FORMING METHOD

(71) Applicant: Masashi Taniguchi, Kanagawa (JP)

(72) Inventor: Masashi Taniguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/960,968

(22) Filed: Apr. 24, 2018

(65) Prior Publication Data

US 2018/0316811 A1 Nov. 1, 2018

(30) Foreign Application Priority Data

Apr. 28, 2017 (JP) ................. 2017-090146

(51) Int. Cl.
*H04N 1/00* (2006.01)
*G06F 3/12* (2006.01)
*G06K 15/00* (2006.01)

(52) U.S. Cl.
CPC ....... *H04N 1/00633* (2013.01); *G06F 3/1206* (2013.01); *G06F 3/1261* (2013.01); *G06K 15/403* (2013.01)

(58) Field of Classification Search
CPC . H04N 1/00633; G06F 3/1206; G06F 3/1261; G06K 15/403
USPC ........................................................ 358/1.15
See application file for complete search history.

(56) References Cited

U.S. PATENT DOCUMENTS

| 4,901,994 A * | 2/1990 | Ishiguro | B42C 1/125 270/58.11 |
| 4,974,823 A * | 12/1990 | Ishiguro | B42C 1/12 270/58.09 |
| 5,126,786 A * | 6/1992 | Tanaka | G03G 15/50 355/46 |
| 6,292,267 B1* | 9/2001 | Mori | B65H 31/24 358/1.15 |
| 6,592,275 B1* | 7/2003 | Aihara | G06F 3/1207 358/1.15 |
| 2001/0022662 A1* | 9/2001 | Hosoda | G03G 15/6538 358/1.9 |
| 2005/0017426 A1* | 1/2005 | Hirata | B65H 37/00 270/58.08 |

FOREIGN PATENT DOCUMENTS

| JP | 9-194126 | 7/1997 |
| JP | 2015-043102 | 3/2015 |
| JP | 2015-123586 | 7/2015 |

* cited by examiner

*Primary Examiner* — Allen H Nguyen
(74) *Attorney, Agent, or Firm* — Duft & Bornsen, PC

(57) ABSTRACT

An image forming apparatus includes circuitry configured to receive a first print job and ejection-destination designating information designating one of a plurality of ejection destinations as an ejection destination of a first printed matter based on the first print job. The circuitry is configured to perform, based on the ejection-destination designating information, a determination of whether to eject the first printed matter to a previous ejection destination to which a second printed matter has been ejected based on a second print job received one before the first print job. The circuitry is configured to select the ejection destination of the first printed matter according to the determination.

15 Claims, 17 Drawing Sheets

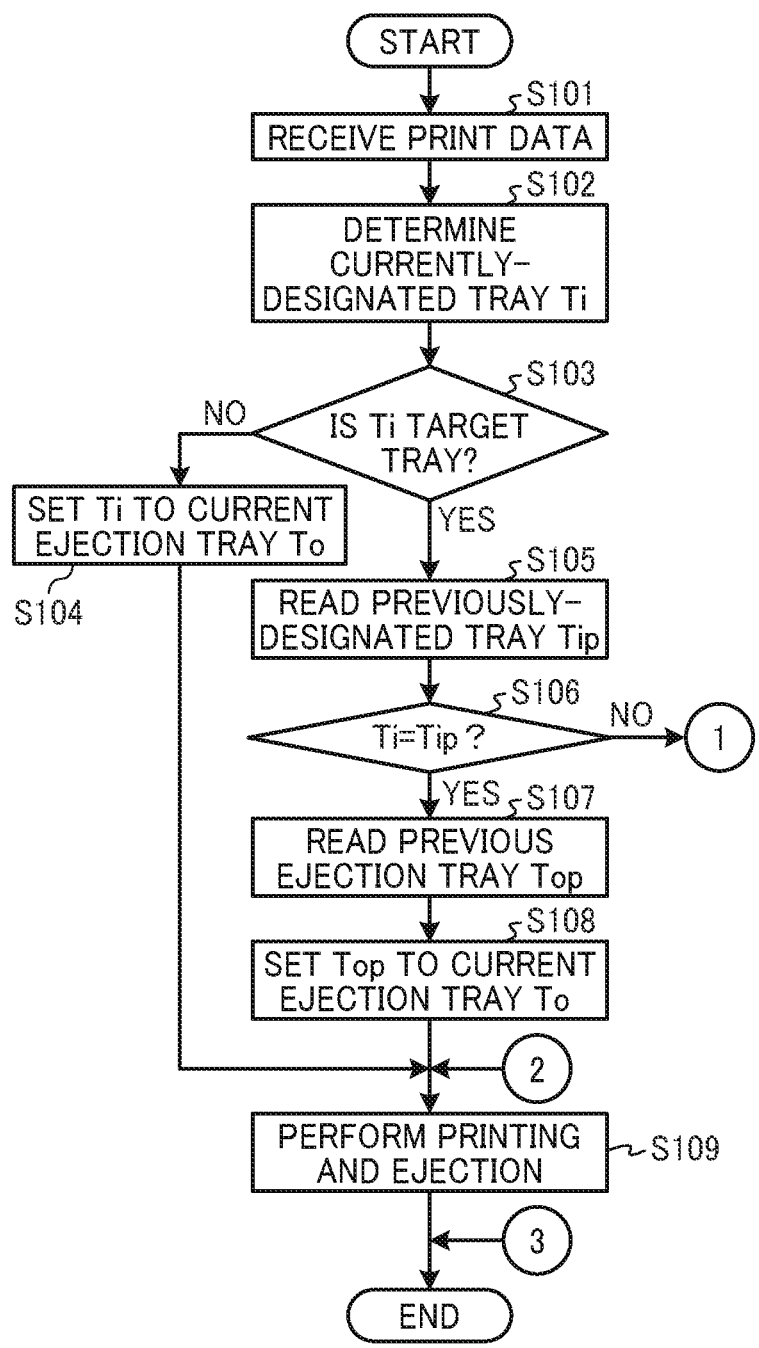

FIG. 8

| | FIRST JOB | | SECOND JOB | | THIRD JOB | | FOURTH JOB | | FIFTH JOB | | SIXTH JOB | | SEVENTH JOB |
|---|---|---|---|---|---|---|---|---|---|---|---|---|---|
| (1) | TRAY 1 (GROUP A) | → | TRAY 1 (GROUP A) | → | TRAY 1 (GROUP A) | | ... | | ... | | ... | | ... |
| (2) | TRAY 1 (GROUP A) | → | TRAY 1 (GROUP A) | → | TRAY 2 (GROUP B) | | ... | | ... | | ... | | ... |
| (3) | TRAY 1 (GROUP A) | → | TRAY 1 (GROUP A) | → | TRAY 2 (GROUP B) | → | TRAY 2 (GROUP B) | → | TRAY 1 (GROUP C) | | ... | | ... |
| (4) | TRAY 1 (GROUP A) | → | TRAY 1 (GROUP A) | → | TRAY 2 (GROUP B) | → | TRAY 2 (GROUP B) | → | TRAY 1 (GROUP C) | → | TRAY 2 (GROUP D) | → | TRAY 1 (GROUP E) |
| (5) | TRAY 1 (GROUP A) | → | TRAY 1 (GROUP A) | → | BODY TRAY (ASYMMETRIC TRAY) | → | TRAY 1 (GROUP B) | | ... | | ... | | ... |
| (6) | TRAY 1 (GROUP A) | → | TRAY 1 (GROUP A) | → | FOLLOW PRINTER (GROUP A) ※DESIGNATE TRAY 1 ACCORDING TO DEVICE SETTING | → | TRAY 1 (GROUP A) | | ... | | ... | | ... |
| (7) | TRAY 1 (GROUP A) | → | TRAY 1 (GROUP A) | → | FOLLOW PRINTER (GROUP B) ※DESIGNATE TRAY 2 ACCORDING TO DEVICE SETTING | → | TRAY 1 (GROUP C) | | ... | | ... | | ... |

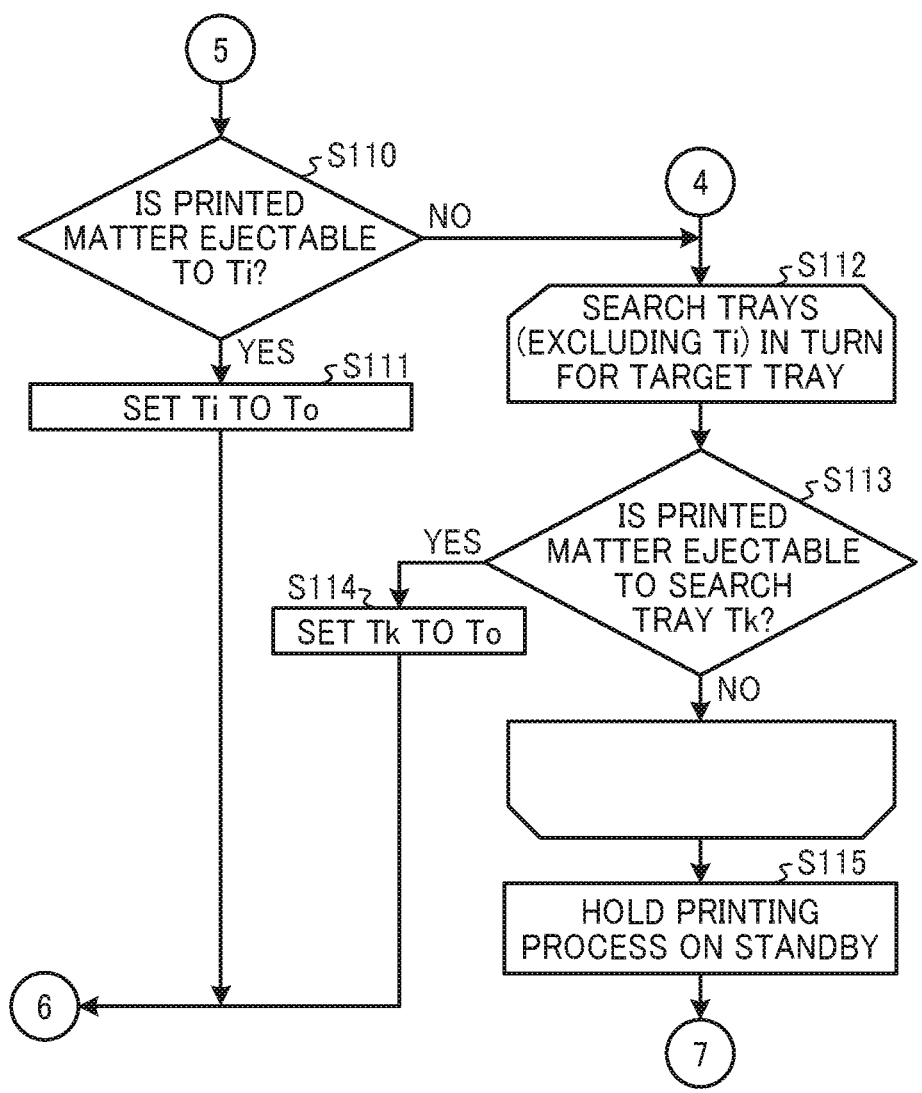

FIG. 12

PRINTER INITIAL SETTING — 301 — END

| TEST PRINTING | DATA OPERATION AND MANAGEMENT |

NUMBER OF SHEETS
TONER SAVING
SUB PAPER SIZE
SPOOL IMAGE
LETTERHEAD SETTING

SWITCHING OF EJECTION MODE   CANCEL   SET

SELECT ITEM AND PRESS [SET] KEY

YES   NO

EMPTY-TRAY EJECTION MODE   DESIGNATED-TRAY EJECTION MODE

IMAGE FORMING APPARATUS, IMAGE FORMING SYSTEM, AND IMAGE FORMING METHOD

CROSS-REFERENCE TO RELATED APPLICATIONS

This patent application is based on and claims priority pursuant to 35 U.S.C. § 119(a) to Japanese Patent Application No. 2017-090146, filed on Apr. 28, 2017, in the Japan Patent Office, the entire disclosure of which is hereby incorporated by reference herein.

BACKGROUND

Technical Field

Aspects of the present disclosure relate to an image forming apparatus, an image forming system, and an image forming method.

Related Art

In an image forming apparatus, such as a multifunction peripheral (MFP) or a laser printer, a multi tray unit (multi bin unit) including a plurality of trays is used to distribute and eject a plurality of printed matters.

SUMMARY

In an aspect of the present disclosure, there is provided an image forming apparatus that includes circuitry configured to receive a first print job and ejection-destination designating information designating one of a plurality of ejection destinations as an ejection destination of a first printed matter based on the first print job. The circuitry is configured to perform, based on the ejection-destination designating information, a determination of whether to eject the first printed matter to a previous ejection destination to which a second printed matter has been ejected based on a second print job received one before the first print job. The circuitry is configured to select the ejection destination of the first printed matter according to the determination.

In another aspect of the present disclosure, there is provided an image forming system that includes an image forming apparatus to distribute and eject one or more of a plurality of printed matters to a plurality of ejection destinations and an information processing apparatus connected to the image forming apparatus through a network. The information processing apparatus includes circuitry to generate ejection-destination designating information designating one of the plurality of ejection destinations as an ejection destination of a first printed matter based on a first print job. The image forming apparatus includes circuitry configured to perform, based on the ejection-destination designating information, a determination of whether to eject the first printed matter to a previous ejection destination to which a second printed matter has been ejected based on a second print job received one before the first print job, and select the ejection destination of the first printed matter according to the determination.

In still another aspect of the present disclosure, there is provided an image forming method that includes receiving a first print job and ejection-destination designating information designating one of a plurality of ejection destinations as an ejection destination of a first printed matter based on the first print job; performing, based on the ejection-destination designating information, a determination of whether to eject the first printed matter to a previous ejection destination to which a second printed matter has been ejected based on a second print job received one before the first print job; and selecting the ejection destination of the first printed matter according to the determination.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating patterns of grouping performed in an ejection process according to the first embodiment;

FIG. 12 is a diagram exemplifying a setting screen of the image forming apparatus according to a fourth embodiment of the present disclosure;

Figure 1:
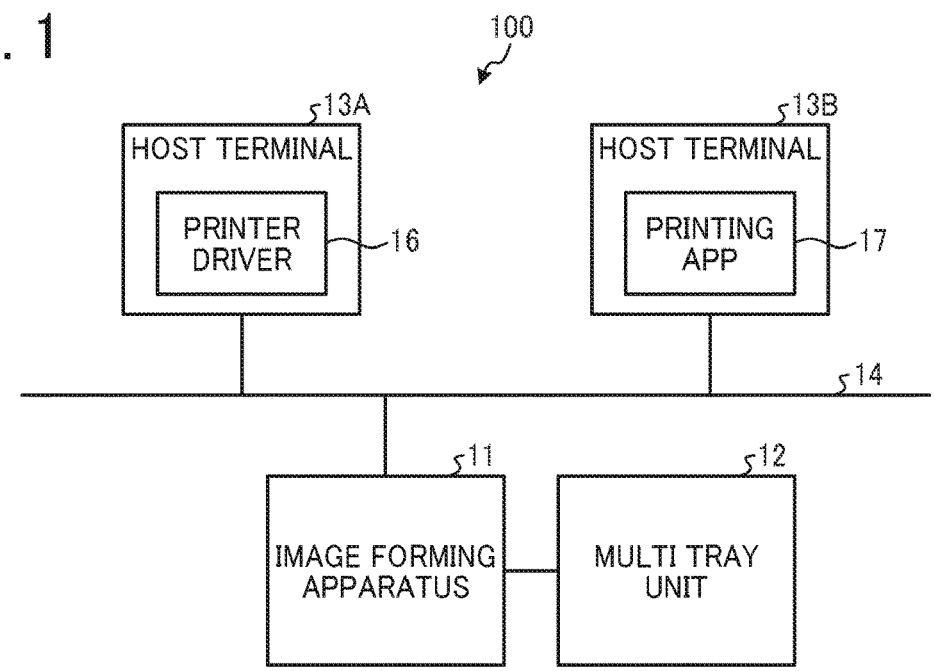
FIG. 1 is a block diagram illustrating a configuration of an image forming system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, the details of each embodiment will be described with reference to the attached drawings. In describing the specification and the drawings according to the respective embodiments, the same reference numerals will be given to the constituent elements having substantially the same functional arrangement to omit redundant explanation.

An image forming apparatus, an image forming system, an image forming method, and a recording medium according to embodiments of the present disclosure are described below with reference to the accompanying drawings. The present invention is not limited by the following embodiments, and the constituent elements in the following embodiments include those which can be easily conceived by those skilled in the art, substantially the same one, and so-called equivalent ranges. Various omissions, substitutions, changes, and combinations of constituent elements can be made without departing from the gist of the following embodiments.

First Embodiment

FIG. 1 is a block diagram of a configuration of an image forming system 100 according to a first embodiment of the present disclosure. The image forming system 100 according to the present embodiment includes an image forming apparatus 11, a multi tray unit 12, and host terminals (information processing apparatuses) 13A and 13B, which are connected via a network 14.

The image forming apparatus 11 is an apparatus, such as an MFP or a laser printer, that performs printing processing to form, e.g., characters or images on a medium, such as paper. In the present embodiment, the medium on which the printing process is performed is referred to as a printed matter. The image forming apparatus 11 generates a printed matter based on print data transmitted from the host terminals 13A and 13B. The image forming apparatus 11 has an interface to connect the multi tray unit 12 and an interface to connect to the network 14.

The multi tray unit 12 is a device that includes a plurality of trays and distribute and eject a plurality of printed matters to the plurality of trays according to a control signal from the image forming apparatus 11 connected via the interface. The multi tray unit 12 may be referred to as a multi bin unit. The "tray" may also be referred to as "bin". When the printed matter is a sheet of paper, "ejection" can be read as "sheet ejection". The multi tray unit 12 according to the present embodiment is an independent unit detachably attached to the image forming apparatus 11.

The host terminals 13A and 13B are information processing apparatuses, such as personal computers (PCs), tablet terminals, or smartphones, that generate print data to cause the image forming apparatus 11 to execute printing processing. The host terminals 13A and 13B have interfaces to connect to the network 14. Software, such as a printer driver 16 and a printing application (app) 17, to generate and transmit print data based on a user's input operation are installed in the host terminals 13A and 13B. The print data includes information indicating the content of a print job.

For each print job, data to be printed (image data, text data, etc.), setting information (paper size, number of printed sheets, etc.), a command, ejection-destination designating information, and the like are associated. The ejection-destination designating information is information for designating the ejection destination of the printed matter printed by the print job. The printer driver 16 and the printing application 17 perform processes to generate and transmit print data according to a user's input operation with respect to input devices (keyboard, touch panel, etc.) of the host terminals 13A and 13B.

The network 14 is a computer communication means, such as Ethernet (registered trademark) or Wi-Fi, and constructs a local area network (LAN) including the image forming apparatus 11 and the host terminals 13A and 13B. The network 14 may allow communication between devices (e.g., the image forming apparatus 11 and the host terminals 13A and 13B) connected to the LAN and a cloud server on the Internet via, e.g., a router.

Figure 2:
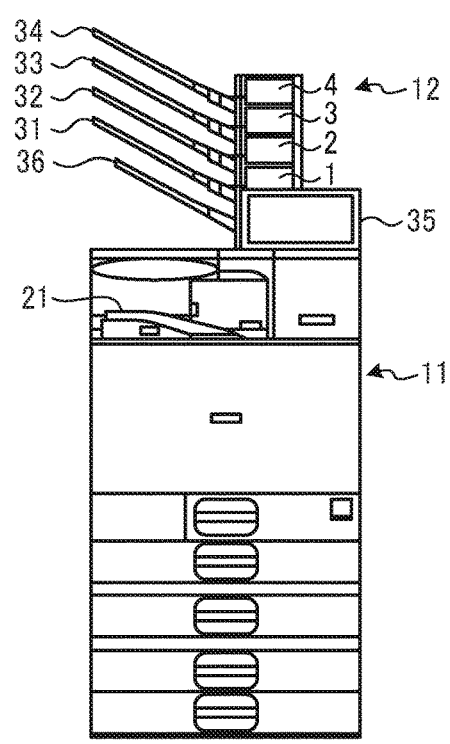
FIG. 2 is a diagram illustrating an external configuration of an image forming apparatus to which a multi tray unit according to a first embodiment is coupled.

FIG. 2 is an illustration of an external configuration of the image forming apparatus 11 to which the multi tray unit 12 according to the first embodiment is connected. The multi tray unit 12 illustrated in FIG. 2 is coupled to an upper part of the image forming apparatus 11. The image forming apparatus 11 includes a body tray 21 (non-target tray). The multi tray unit 12 includes four distribution trays 31 to 34 (target trays). A finisher 35 is further connected to the image forming apparatus 11 according to the present embodiment. The finisher 35 is a unit having a staple function to bind a plurality of printed matters. The printed matters bound by the finisher 35 are ejected to a finisher tray 36 (non-target tray).

Figure 3:
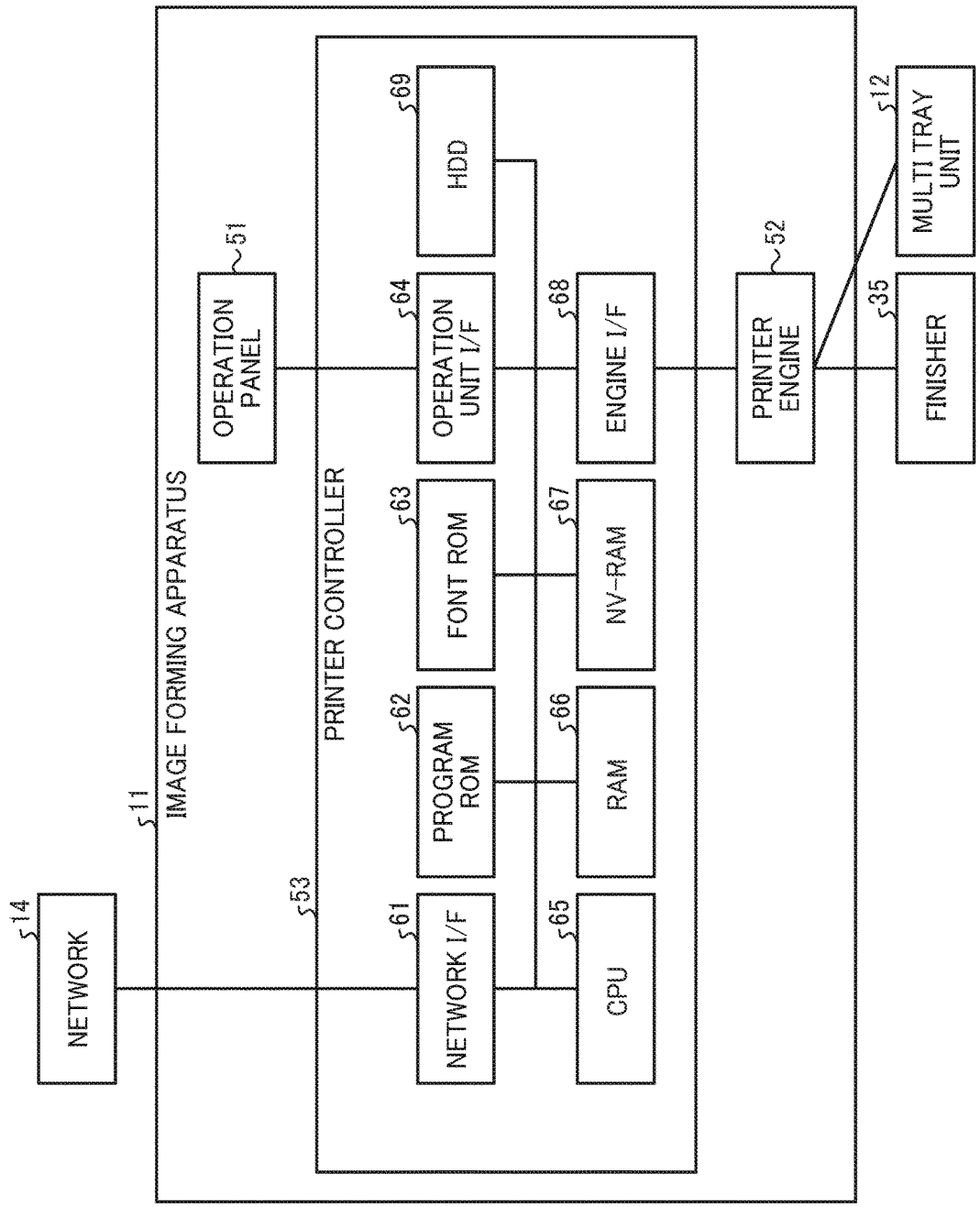
FIG. 3 is a block diagram illustrating a hardware configuration of the image forming apparatus according to the first embodiment.

FIG. 3 is a block diagram illustrating a hardware configuration of the image forming apparatus 11 according to the first embodiment. The image forming apparatus 11 includes an operation panel 51, a printer engine 52, and a printer controller 53.

The operation panel 51 is a unit that accepts an input operation to the image forming apparatus 11 by a user, and is configured using, for example, a liquid crystal panel, a touch panel, or a keyboard.

The printer engine 52 is a device to generate a printed matter according to a control signal from the printer controller 53 and eject the printed matter to a predetermined ejection destination. The printer engine 52 includes, for example, a sheet feed device to feed a medium from a sheet feed tray, a light irradiation device to irradiate a photoconductor with a laser light output from a laser head, a toner attachment device to attach toner to the photoconductor, a transfer-and-fixing device to transfer and fix a toner image on the medium, and an ejection device to eject the medium (printed matter), on which the toner is fixed, to an ejection destination.

The printer controller 53 is an electronic control unit that controls the printer engine 52 according to, e.g., an input operation to the operation panel 51, print data transmitted from the host terminals 13A and 13B, and a feedback signal from the multi tray unit 12. The printer controller 53 sets an ejection tray to which the printed matter is actually ejected, according to, e.g., the ejection-destination designating information included in the print data and the tray ejection state information transmitted from the multi tray unit 12. The tray ejection state information is information indicating the ejection states of the distribution trays 31 to 34, that is, whether a printed matter remains in each of the distribution trays 31 to 34. For example, when a printed matter remains in a designated tray corresponding to an ejection destination designated by the ejection-destination designating information, the printer controller 53 may set, e.g., a tray other than the designated tray as the ejection tray. A specific distribution method of printed matters to the distribution trays 31 to 34 will be described later.

The printer controller 53 includes a network interface (I/F) 61, a program read-only memory (ROM) 62, a font ROM 63, an operation unit I/F 64, a central processing unit (CPU) 65, a random access memory (RAM) 66, a nonvolatile RAM (NV-RAM) 67, an engine I/F 68, and a hard disk drive (HDD) 69.

The network I/F 61 is an interface to connect to the network 14 and communicate with the host terminals 13A and 13B. The program ROM 62 is a memory to store, e.g., programs for managing data in the printer controller 53, controlling peripheral modules, such as the multi tray unit 12, the finisher 35, and setting an ejection tray. The font ROM 63 is a memory to store data of various kinds of fonts used for printing. The operation unit I/F 64 is an interface to receive an input signal from the operation panel 51 and transmit display data to the operation panel 51. The CPU 65 is one or a plurality of integrated circuits that execute various processes according to, e.g., programs stored in the program ROM 62 and print data received from the host terminals 13A and 13B. The RAM 66 acts as, e.g., a working memory when the CPU 65 executes processing, a buffer to temporarily store print data received from the host terminals 13A and 13B, and a memory to process data stored in the buffer. The NV-RAM 67 is a nonvolatile memory to hold data even when the power of the image forming apparatus 11 is turned off. The engine I/F 68 is an interface to transmit a control signal generated in the printer controller 53 to the printer engine 52 and receive a feedback signal from the printer engine 52. The HDD 69 is a storage device to store various data in a hard disk which is a storage medium.

Figure 4:
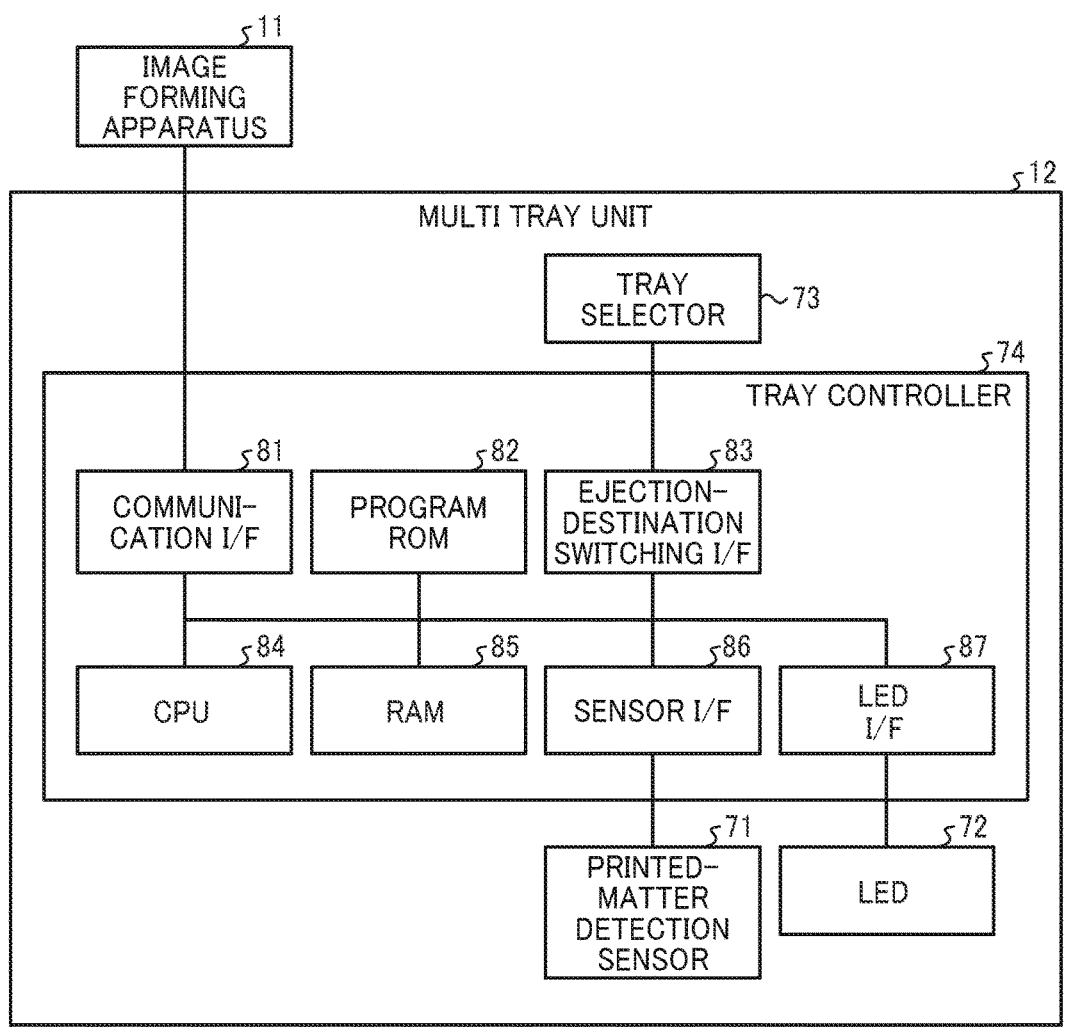
FIG. 4 is a block diagram illustrating a hardware configuration of the multi tray unit according to the first embodiment.

FIG. 4 is a block diagram illustrating a hardware configuration of the multi tray unit 12 according to the first embodiment. The multi tray unit 12 includes a printed-matter detection sensor 71, a light emitting diode (LED) 72, a tray selector 73, and a tray controller 74.

The printed-matter detection sensor 71 is a sensor to detect the ejection state of each of the distribution trays 31 to 34, that is, whether a printed matter remains on each of the distribution trays 31 to 34. The tray ejection state information indicating the ejection state of each of the distribution trays 31 to 34 is transmitted to the image forming apparatus 11 via the tray controller 74. The LED 72 is a light emitting element indicating a state in which a printed matter remains on each of the distribution trays 31 to 34. The tray selector 73 is a mechanism to switch a target tray to which a printed matter is ejected among the distribution trays 31 to 34, according to a control signal from the tray controller 74.

The tray controller 74 is an electronic control unit to control the tray selector 73 and the LED 72 according to, e.g., a tray setting signal indicating an ejection tray set by the image forming apparatus 11 and a detection signal of the printed-matter detection sensor 71. The tray controller 74 transmits a detection signal of the printed-matter detection sensor 71 to the image forming apparatus 11. The tray controller 74 includes a communication I/F 81, a program ROM 82, an ejection destination switching I/F 83, a CPU 84, a RAM 85, a sensor I/F 86, and an LED I/F 87.

The communication I/F 81 is an interface to communicate with the image forming apparatus 11. The program ROM 82 is a memory to store programs for managing data in the tray controller 74 and controlling peripheral modules, such as the printed-matter detection sensor 71, the LED 72, and the tray selector 73. The ejection destination switching I/F 83 is an interface to transmit a control signal to the tray selector 73 and the like. The CPU 84 is one or a plurality of integrated circuits to execute various processes according to, e.g., the programs stored in the program ROM 82, the tray setting signal transmitted from the image forming apparatus 11, and the detection signal of the printed-matter detection sensor 71. The RAM 85 is a memory that acts as, e.g., a working area when the CPU 84 executes processing. The sensor I/F 86 is an interface to receive a detection signal from the printed-matter detection sensor 71 and the like. The LED I/F 87 is an interface to control the turning on/off of the LED 72.

Figure 5:
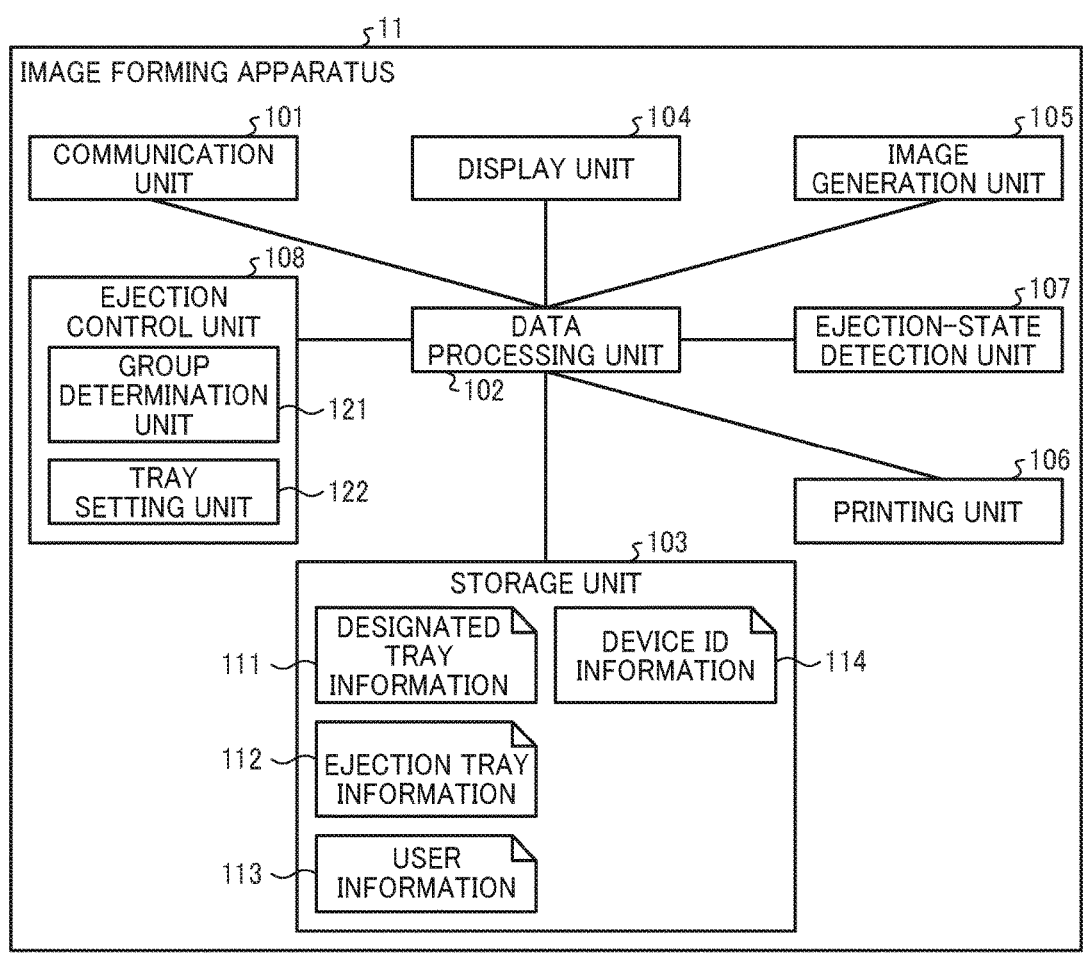
FIG. 5 is a diagram illustrating a functional configuration of the image forming apparatus according to the first embodiment.

FIG. 5 is an illustration of a functional configuration of the image forming apparatus 11 according to the first embodiment. The image forming apparatus 11 includes a communication unit 101, a data processing unit 102, a storage unit 103, a display unit 104, an image generation unit 105, a printing unit 106, an ejection-state detection unit 107, and an ejection control unit 108.

The communication unit 101 establishes communication with the host terminals 13A and 13B via the network 14. The communication unit 101 is constituted by, e.g., the network I/F 61 and the CPU 65.

The data processing unit 102 performs data processing to achieve various functions of the image forming apparatus 11. The data processing unit 102 according to the present embodiment performs data processing to achieve, e.g., a printing function to generate a printed matter (e.g., form an image on a medium) and an ejection function to eject a printed matter to an appropriate tray selected from the plurality of trays 21, 31 to 34, and 36. The data processing unit 102 is constituted by, e.g., the CPU 65.

The storage unit 103 stores various data to achieve various functions of the image forming apparatus 11. The storage unit 103 according to the present embodiment stores designated tray information 111, ejection tray information 112, user information 113, and device ID information 114. The designated tray information 111 is information indicating the ejection destination of the printed matter designated by the user of the host terminals 13A and 13B, the printer driver 16, or the printing application 17, and stores information specifying designated trays corresponding to print jobs issued in the past. The ejection tray information 112 is information indicating an ejection tray set as the ejection destination to which a printed matter is actually ejected, and stores information specifying ejection trays corresponding to print jobs issued in the past. The user information 113 is identification information identifying a user who issued a print job (who operated the host terminals 13A and 13B), and stores information specifying users corresponding to print jobs issued in the past. The device ID information 114 is identification information identifying the image forming apparatus 11. The storage unit 103 may store information other than the above-described information 111 to 114. The storage unit 103 is constituted by, e.g., the RAM 66, the NV-RAM 67, and the HDD 69.

The display unit 104 receives an input operation of a user who operates the image forming apparatus 11, provides information to the user, and the like. The display unit 104 is constituted by, e.g., the operation panel 51.

The image generation unit 105 generates a print target designated by the user on a member, such as the photoconductor or a transfer object, according to, e.g., the print data transmitted from the host terminals 13A and 13B. The image generation unit 105 is constituted by, e.g., the printer engine 52.

The printing unit 106 outputs an image generated by the image generation unit 105 onto the medium, to generate a printed matter. The printing unit 106 is constituted by, e.g., the printer engine 52.

The ejection-state detection unit 107 detects the ejection state of each of the distribution trays 31 to 34 of the multi tray unit 12. The ejection state is detected, for example, by receiving a detection signal of the printed-matter detection sensor 71 of the multi tray unit 12. The ejection-state detection unit 107 is constituted by, e.g., the CPU 65.

The ejection control unit 108 sets the ejection tray to which the printed matter is actually ejected. The ejection control unit 108 sets the ejection tray based on, for example, the print data, such as ejection-destination designating information, transmitted from the host terminals 13A and 13B and the ejection state of the distribution trays 31 to 34 detected by the ejection-state detection unit 107. The ejection control unit 108 is constituted by, e.g., the CPU 65.

The ejection control unit 108 according to the present embodiment performs group distribution processing to group a plurality of continuously-issued print jobs and set an ejection tray for each group. The ejection control unit 108 includes a group determination unit 121 and a tray setting unit 122. The group determination unit 121 groups the plurality of print jobs issued based on the print data received from the host terminals 13A and 13B, according to conditions. The group determination unit 121 determines, as one group, a plurality of print jobs for which the same ejection destination is continuously designated by the ejection-destination designating information or one print job for which an ejection destination different from the preceding and subsequent print jobs is designated. The tray setting unit 122 sets an ejection tray for each group. That is, a plurality of printed matters printed by print jobs of the same group are ejected to the same ejection tray.

With the above-described configuration, the image forming apparatus 11 includes a receiver, a determiner, and a controller. The receiver receives a first print job (a print job to be determined) and an ejection-destination designating information that designates an ejection destination of a first printed matter based on the first print job. The determiner determines, based on the ejection-destination designating information, whether the first printed matter is to be ejected to an ejection destination (previous ejection destination) to which a second printer matter is ejected based on a second print job having been received preceding to the first print job. The controller controls the ejection destination (current ejection destination) of the first printed matter according to a determination made by the determination unit. In the present embodiment, the receiver is constituted by, e.g., the communication unit 101, the data processing unit 102, the storage unit 103. The determiner is constituted by, e.g., the data processing unit 102, the storage unit 103, the ejection-state detection unit 107, and the ejection control unit 108. The controller is constituted by, e.g., the data processing unit 102 and the ejection control unit 108.

Figure 6B:
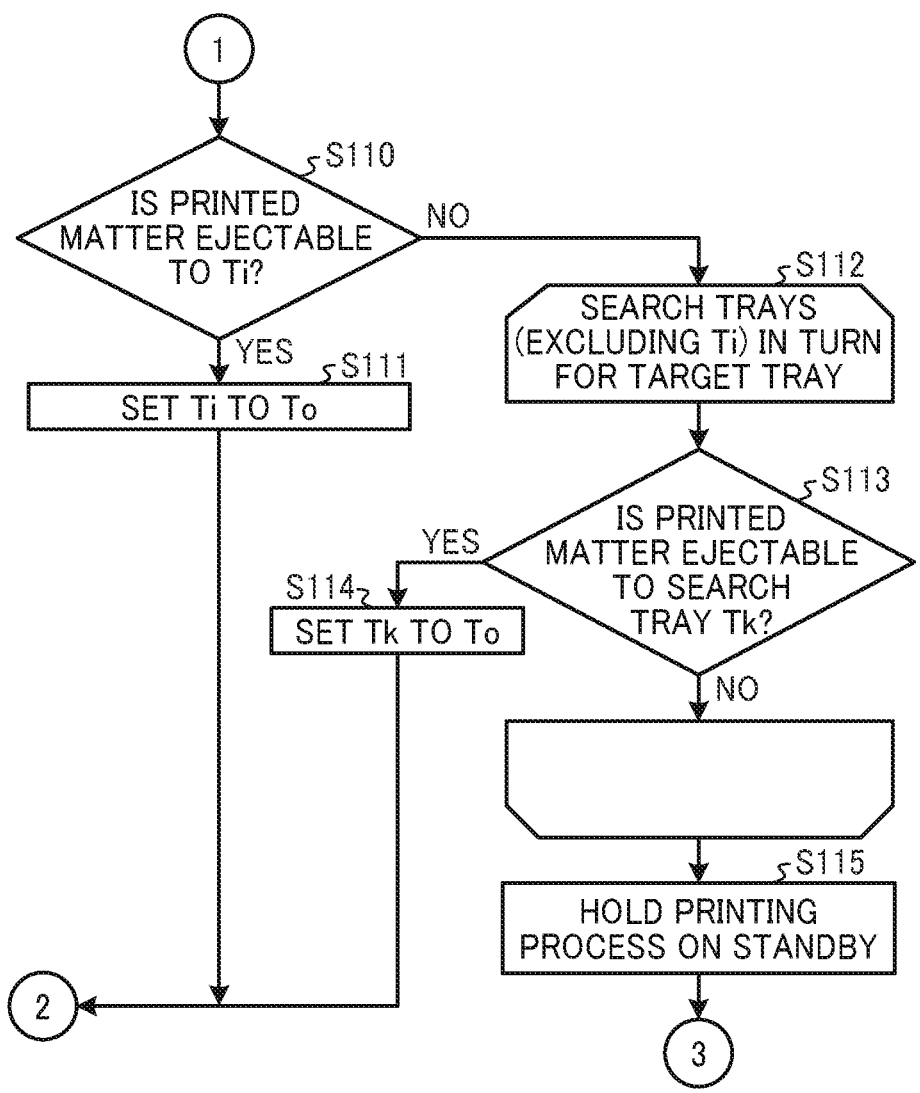
FIG. 6 (consisting of FIGS. 6A and 6B) is a flowchart illustrating a flow of a printed-matter ejection process in the image forming apparatus according to the first embodiment.

FIG. 6 (consisting of FIGS. 6A and 6B) is a flowchart illustrating a flow of an ejection process of a printed matter in the image forming apparatus 11 according to the first embodiment. First, the communication unit 101 receives print data from the host terminals 13A and 13B via the network 14 (S101). The print data includes the ejection-destination designating information indicating an ejection destination of a printed matter designated by a user or software, such as the printer driver 16 or the print application 17, included in the host terminals 13A and 13B.

Figure 7:
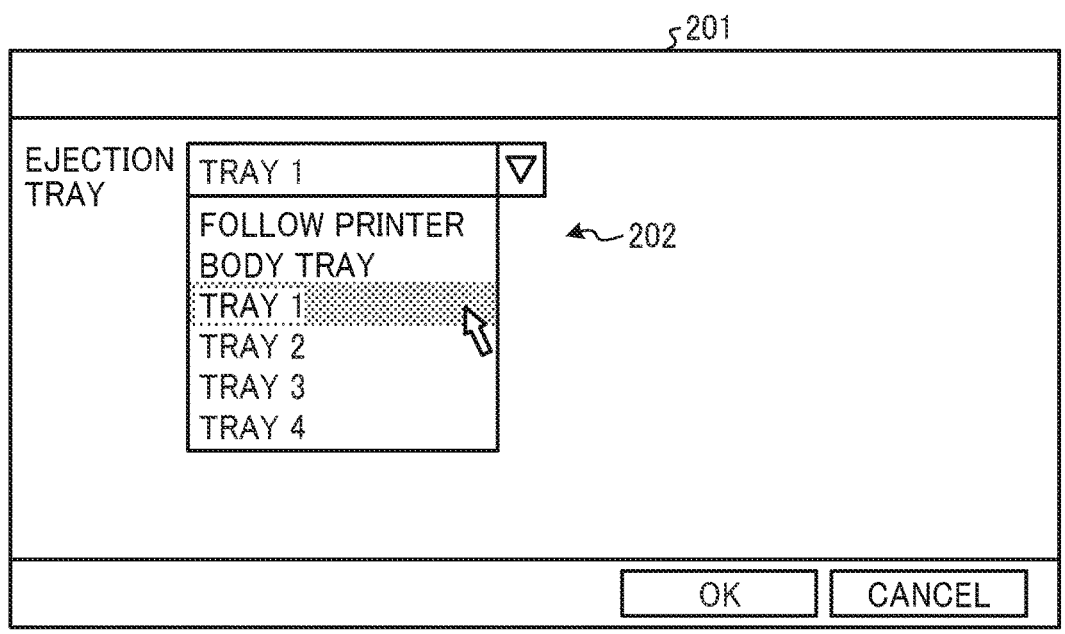
FIG. 7 is a diagram illustrating an ejection-destination designation screen according to the first embodiment.

FIG. 7 is an illustration of an ejection-destination designation screen 201 according to the first embodiment. The ejection-destination designation screen 201 is an example of an input screen displayed when the user operating the host terminals 13A and 13B designates the ejection destination of a printed matter. The ejection-destination designation screen 201 is displayed on displays of the host terminals 13A and 13B. The ejection-destination designation screen 201 is provided with an ejection-destination selection unit 202 including a plurality of options that can be selected by the user. The options of the ejection-destination selection unit 202 according to the present embodiment include "follow printer", "body tray", "tray 1", "tray 2", "tray 3", and "tray 4". The "follow printer" option is selected when the host terminals 13A and 13B do not designate a specific ejection destination but adopts the ejection destination in the setting of the image forming apparatus 11. The "body tray" option is selected when the body tray 21 of the image forming apparatus 11 is designated as the ejection destination. The "tray 1" option is selected when the first distribution tray 31 of the multi tray unit 12 is designated as the ejection destination. The "tray 2" option is selected when the second distribution tray 32 of the multi tray unit 12 is designated as the ejection destination. The "tray 3" option is selected when the third distribution tray 33 of the multi tray unit 12 is designated as the ejection destination. The "tray 4" option is selected when the fourth distribution tray 34 of the multi tray unit 12 is designated as the ejection destination.

With reference back to FIG. 6, after the communication unit 101 receives the print data (S101), the ejection control unit 108 determines a currently-designated tray Ti based on the received print data (S102). The currently-designated tray Ti is a tray corresponding to the ejection destination designated by the ejection-destination designating information included in the print data received this time, that is, a designated tray corresponding to the print job issued this time. In the example illustrated in FIG. 7, when the "body tray" is designated as the ejection destination, the currently-designated tray Ti is set to the body tray 21. Likewise, when the "tray 1" is designated, the currently-designated tray Ti is set to the first distribution tray 31. When the "tray 2" is designated, the currently-designated tray Ti is set to the second distribution tray 32. When the "tray 3" is designated, the currently-designated tray Ti is set to the third distribution tray 33. When the" tray 4 "is designated, the currently-designated tray Ti is set to the fourth distribution tray 34. When the "follow printer" option is selected as the ejection destination, the currently-designated tray Ti is determined according to a predetermined method. The predetermined method is, for example, a method of setting, for example, a default tray (for example, the body tray 21), an empty tray (a tray in which a printed matter does not remain), a tray designated in the previous print job, a tray to which a printed matter has actually been ejected in the previous print job, the most frequently used tray, to the currently-designated tray Ti.

The ejection control unit 108 determines whether the currently-designated tray Ti is a target tray to be subjected to the group distribution processing (S103). The group distribution processing is processing to group a plurality of print jobs and set an ejection tray for each group, as described above. According to a use situation, it is appropriately determined which tray among the plurality of trays 21, 31 to 34, and 36 included in the image forming system 100 is to be set as the target tray. In the present embodiment, the four distribution trays 31 to 34 of the multi tray unit 12 are set as target trays, and the body tray 21 and the finisher tray 36 are set as non-target trays that are not to be subjected to the group distribution processing.

If the currently-designated tray Ti is not the target tray (NO in S103), the currently-designated tray Ti is set to the current ejection tray To (S104). The current ejection tray To is an ejection tray corresponding to a tray to which a printed matter printed by a print job generated based on the print data received this time is actually ejected, that is, a tray corresponding to the print job issued this time. The image generation unit 105 and the printing unit 106 execute a printing process to generate a printed matter according to the print job, and the ejection control unit 108 ejects the printed matter to the current ejection tray To (S109).

Alternatively, when the currently-designated tray Ti is the target tray (YES in S103), the data processing unit 102 reads a previously-designated tray Tip (designated tray information 111) from the storage unit 103 (S105). The previously-designated tray Tip is a tray corresponding to the ejection destination designated by the ejection-destination designating information included in the previously-received print data, that is, a designated tray corresponding to the previously-issued print job. The ejection control unit 108 determines whether the currently-designated tray Ti is identical to the previously-designated tray Tip (S106).

When the currently-designated tray Ti is identical to the previously-designated tray Tip (YES in S106), the data processing unit 102 reads the previous ejection tray Top (ejection tray information 112) from the storage unit 103 (S107). The previous ejection tray Top is a tray to which the printed matter, printed by the print job generated based on the print data received one before the print data (print job) to be determined, has been actually ejected, that is, an ejection tray corresponding to the previously-issued print job. The ejection control unit 108 sets the previous ejection tray Top to the current ejection tray To (S108), and the step S109 is executed.

Alternatively, when the currently-designated tray Ti is not identical to the previously-designated tray Tip (NO in S106), the ejection control unit 108 determines whether the printed matter is ejectable to the currently-designated tray Ti (S110). When the ejection-state detection unit 107 detects that the printed matter remains on the currently-designated tray Ti or when the currently-designated tray Ti is already set to an ejection tray in another print job, the ejection control unit 108 according to the present embodiment determines that the currently-designated tray Ti is not ejectable. Note that the method of determining whether ejection is possible is not limited to the above-described method.

If a printed matter is ejectable to the currently-designated tray Ti (YES in S110), the ejection control unit 108 sets the currently-designated tray Ti to the current ejection tray To (S111), and the step S109 is executed. Alternatively, if a printed matter is not ejectable to the currently-designated tray Ti (NO in S110), the ejection control unit 108 performs loop processing to sequentially search for an ejectable target tray (among the distribution trays 31 to 34) (S112). In S112, the currently-designated tray Ti is excluded from the search. For example, when the currently-designated tray Ti is the second distribution tray 32, the ejection control unit 108 retrieves an ejectable tray in an order of the first distribution tray 31, the third distribution tray 33, and the fourth distribution tray 34.

Assuming that target trays to be retrieved are retrieval trays Tk (for example, k=1, 3, and 4), the ejection control unit 108 determines whether a retrieval tray Tk having a smallest value of k is ejectable (S113). When the retrieval tray Tk is ejectable (YES in S113), the ejection control unit 108 sets the retrieval tray Tk as the current ejection tray To (S114), and the step 109 is executed. When the retrieval tray Tk is not ejectable (NO in S113), the ejection control unit 108 retrieves a retrieval tray Tk having a second smallest value of k. If all of the retrieval trays Tk are not ejectable, the ejection control unit 108 causes the image generation unit 105 and the printing unit 106 to wait for the execution of the printing process (S115).

According to the above-described ejection process, when a plurality of printed matters printed by a plurality of printing jobs are distributed and ejected to the plurality of distribution trays 31 to 34, printed matters printed by print jobs of the same group, that is, a plurality of printed matters printed by a plurality of print jobs having the same designated tray and successively issued can be ejected to the same ejection tray. Such a configuration can prevent printed matters printed by print jobs belonging to different groups from being mixed in one ejection tray.

Even if the user is the same, it may be necessary to distribute a plurality of printed matters to a plurality of trays. For example, when one pharmacist (user) outputs prescriptions (printed matters) of a plurality of patients in a pharmacy or the like, the prescriptions of the plurality of patients need to be distributed to a plurality of trays to prevent mixing of the prescriptions. According to the above-described ejection process, a plurality of printed matters can be appropriately distributed to a plurality of ejection destinations.

FIG. 8 is a diagram illustrating a pattern of grouping performed in the ejection process according to the first embodiment. Here, seven patterns (1) to (7) are illustrated for grouping a plurality of continuously-issued print jobs (first to seventh jobs). In FIG. 8, "tray 1" indicates the first distribution tray 31 as a target tray, and "tray 2" indicates the second distribution tray 32 as a target tray.

In the first pattern (1), the first to third jobs are continuously issued, and the designated tray of each of the first to third jobs is the tray 1. In such a case, the first to third jobs belong to the same group A. Therefore, all printed matters printed by the first to third jobs are ejected to one ejection tray (the current ejection tray To).

In the second pattern (2), the first to third jobs are continuously issued, the designated tray of the first and second jobs is the tray 1, the designated tray of the third job is the tray 2. In such a case, the first and second jobs belong to the same group A and the third job belongs to a different group B from the group A. Therefore, the printed matter printed by each of the first and second jobs and the printed matter printed by the third job are ejected to different ejection trays, respectively. In FIG. 8, shaded portions indicate timings at which the group changes, that is, timings at which the ejection tray switches.

In the third pattern (3), the first to fifth jobs are continuously issued. The designated tray of each of the first and second jobs is the tray 1. The designated tray of each of the third and fourth jobs is the tray 2. The designated tray of the fifth job is the tray 1. In such a case, the first and second jobs belong to the group A. The third and fourth jobs belong to the group B. The fifth job belongs to a group C. The designated tray of the fifth job is the same tray 1 as the designated tray of the first and second jobs. However, since the third and fourth jobs whose designated tray is the tray 2 intervene between the second job and the fifth job, the fifth job belongs to the group C different from the group A to which the first and second jobs belong. As described above, even if jobs have the same designated tray, the jobs belong to different groups if there is no continuity in the designation of the tray. At this time, the printed matters printed by the first and second jobs, the printed matters printed by the third and fourth jobs, and the printed matter printed by the fifth job may be ejected to different ejection trays. That is, although the designated tray of the fifth job is the tray 1 similarly with the first and second jobs, the printed matter printed by the fifth job may not be ejected to the tray 1. For example, if the printed matters printed by the first and second jobs remain in the tray 1 when the printed matter printed by the fifth job is ejected, ejection control is performed to eject the printed matter printed by the fifth job to a tray (e.g., an empty tray) other than the tray 1. Further, control may be performed to wait printing of the fifth job or ejection of the printed matter until the printed matter printed by the first and second jobs is removed from the tray 1.

In the fourth pattern (4), the first to seventh jobs are continuously issued. The designated tray of each of the first and second jobs is the tray 1. The designated tray of each of the third and fourth jobs is the tray 2. The designated tray of the fifth job is the tray 1. The designated tray of the sixth job is the tray 2. The designated tray of the seventh job is the tray 1. In such a case, the first and second jobs belong to the group A. The third and fourth jobs belong to the group B. The fifth job belongs to the group C. The sixth job belongs to a group D. The seventh job belongs to a group E. Therefore, the printed matters printed by the first and second jobs, the printed matters printed by the third and fourth jobs, the printed matter printed by the fifth job, and the printed matter printed by the sixth job, and the printed matter printed by the seventh job are ejected to different ejection trays, respectively.

In the fifth pattern (5), the first to fourth jobs are continuously issued. The designated tray of each of the first and second jobs is the tray 1. The designated tray of the third job is the body tray 21 as a non-target tray. The designated tray of the fourth job is the tray 1. In such a case, the first and second jobs belong to the group A. The fourth job belongs to the group B. The third job does not belong to any group. Therefore, the printed matter printed by each of the first and second jobs and the printed matter printed by the fourth job are ejected to different ejection trays set from among the plurality of target trays. The printed matter printed by the third job is ejected to the body tray 21 as the non-target tray.

The sixth pattern (6) and the seventh pattern (7) represent examples in which the "follow printer" option is selected as the ejection destination on the ejection-destination designation screen 201 illustrated in FIG. 7.

In the sixth pattern (6), the designation tray of each of the first, second and fourth jobs is the tray 1. The designation tray corresponding to the designation destination "follow printer" of the third job is set to the tray 1 according to the device setting of the image forming apparatus 11. In such a case, as a result, the designated tray of each of the first to fourth jobs is set to the tray 1. Therefore, all of the first to fourth jobs belong to the group A, and all printed matters printed by the first to fourth jobs are ejected to one ejection tray.

In the seventh pattern (7), the designated tray of each of the first, second, and fourth jobs is the tray 1. The designated tray corresponding to the designation destination "follow printer" of the third job is set to the tray 2 according to the device setting of the image forming apparatus 11. In such a case, as a result, the third job in which the designated tray is the tray 2 is interposed between the second job and the fourth job in which the designated tray is the tray 1. Therefore, the first and second jobs belong to the group A, the third job belongs to the group B, and the fourth job belongs to the group C. Therefore, the printed matter printed by each of the first and second jobs, the printed matter printed by the third job, and the printed matter printed by the fourth job are ejected to different ejection trays, respectively.

A program for achieving the above-described functions of the image forming apparatus 11 is stored in an installable or executable file format in a computer readable storage medium, such as a compact disc-read only memory (CD-ROM) a memory card, a compact disc-recordable (CD-R), or a digital versatile disc (DVD) and provided as a computer program product.

The program may be stored on a computer connected to a network, such as the Internet, and provided so that a user can download the program via the network. Alternatively, the program may be provided via a network, such as the Internet, so that a user can use the program without downloading the program. The program may also be provided with the program embedded in advance in, e.g., the program ROM 62 or the HDD 69. The program may have a module configuration including functions realizable by programs out of functional units included in the image forming apparatus 11. The function realized by the program is loaded into a main memory, such as the RAM 66, by reading and executing the program from a storage medium. That is, the function realized by the program is generated on the main memory.

According to the present embodiment, a plurality of print jobs in which the same ejection destination is continuously designated or one print job in which an ejection destination different from ejection destinations of the previous and subsequent print jobs is designated is handled as one group, and the ejection tray is determined for each group. Such a configuration can prevent printed matters printed by print jobs whose ejection destinations are not continuous from being mixed in one tray. For example, for a plurality of print jobs to be ejected to the same tray, the same tray can be designated as the ejection destinations of the plurality of print jobs. For a plurality of print jobs to be ejected to different trays, different trays can be designated as the ejection destinations of the plurality of print jobs. Such a configuration can properly distribute a plurality of printed matters to a plurality of trays in accordance with a designation operation of the ejection destination by the user.

Hereinafter, other embodiments are described with reference to the drawings. In the following descriptions, the same reference numerals are given to the parts having the same or similar functions and effects as those of the first embodiment, and redundant descriptions thereof may be omitted.

Second Embodiment

Figure 9:
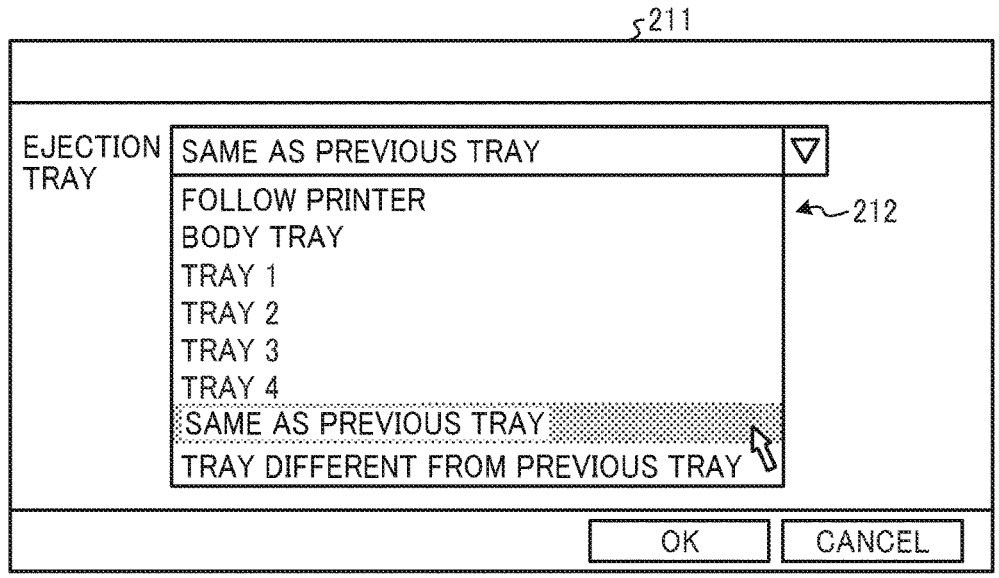
FIG. 9 is a diagram illustrating an ejection-destination designation screen according to a second embodiment of the present disclosure.

FIG. 9 is an illustration of an ejection-destination designation screen 211 according to a second embodiment of the present disclosure. Similarly to the ejection-destination designation screen 201 according to the first embodiment illustrated in FIG. 7, the ejection-destination designation screen 211 according to the present embodiment is an example of an input screen displayed when a user operating the host terminals 13A and 13B designates the ejection destination of a printed matter. An ejection-destination selection unit 212 of the ejection-destination designation screen 211 according to the present embodiment includes options of "same as previous tray" and "tray different from previous tray" in addition to the options of the ejection-destination selection unit 202 of the ejection-destination designation screen 201 according to the first embodiment.

The option "same as previous tray" is selected when the host terminals 13A and 13B do not designate specific trays (e.g., the tray 1 to the tray 4) and the ejection tray from which the printed matter was actually ejected in the previous print job is designated as the ejection destination of the current print job. The option "tray different from previous tray" is selected when the host terminals 13A and 13B do not designate specific trays and an appropriate tray (e.g., an empty tray) different from the ejection tray on which the printed matter was actually ejected in the previous print job is designated as the ejection destination in the current print job. The printer driver 16 of the host terminal 13A and the printing application 17 of the host terminal 13B generate the ejection-destination designating information indicating the ejection destination selected from the options of the ejection-destination selection unit 212 and transmits print date including the ejection-destination designating information to the image forming apparatus 11.

Figure 10A:
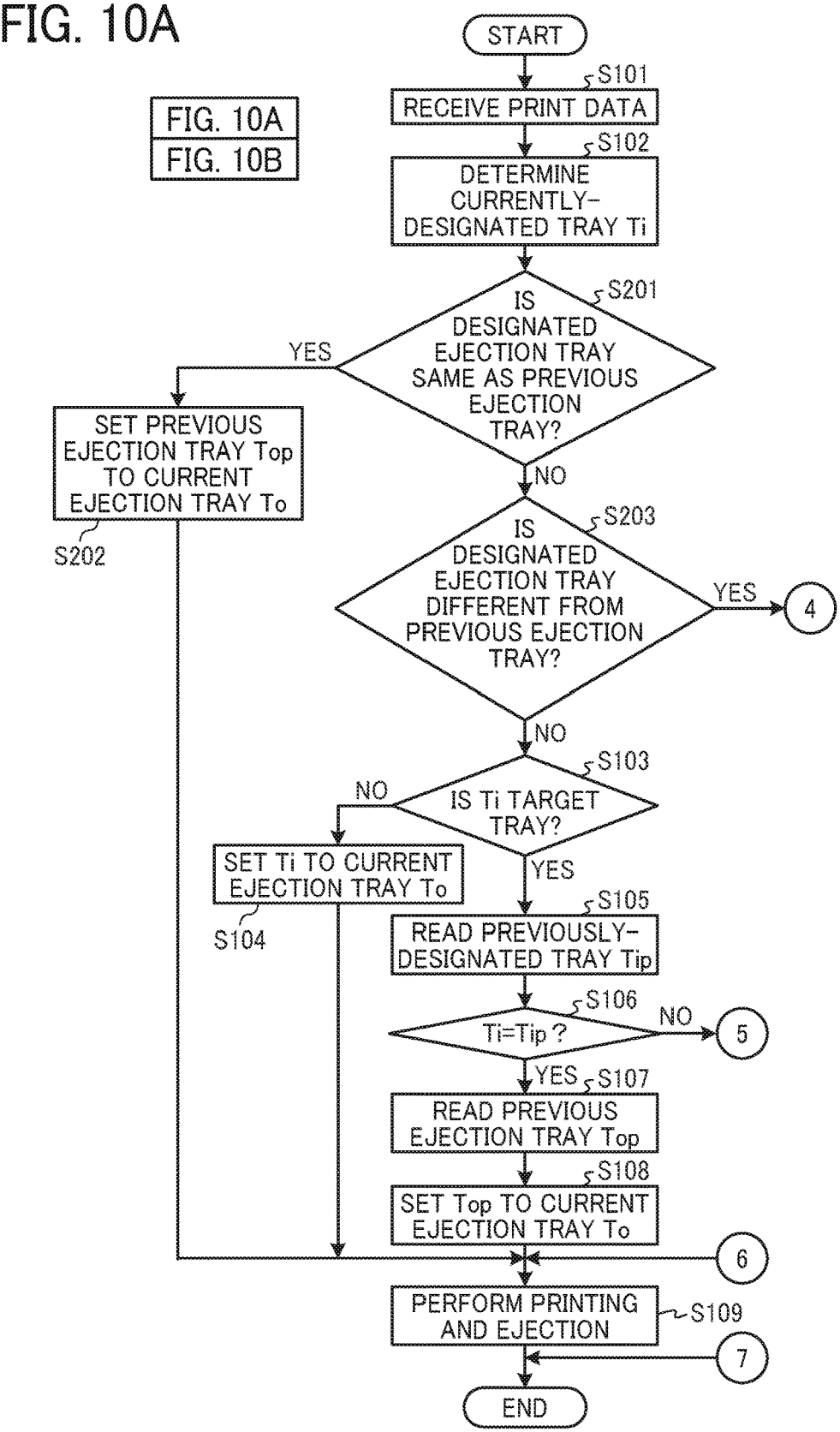
FIG. 10 (consisting of FIGS. 10A and 10B) is a flowchart illustrating a flow of a printed-matter ejection process in the image forming apparatus according to the second embodiment.

FIG. 10 (consisting of FIGS. 10A and 10B) is a flowchart illustrating a flow of an ejection process of a printed matter in the image forming apparatus 11 according to the second embodiment. The ejection process according to the present embodiment differs from the ejection process according to the first embodiment illustrated in FIG. 6 in that the ejection process according to the present embodiment includes steps S201 to S203. Differences from the ejection process according to the first embodiment illustrated in FIG. 6 are described below.

The ejection control unit 108 of the image forming apparatus 11 determines the currently-designated tray Ti (S102) based on the ejection-destination designating information included in the print data transmitted from the host terminals 13A and 13B. At this time, when the designated ejection destination is the "tray different from previous tray", the ejection control unit 108 according to the present embodiment sets the previous ejection tray Top (the ejection tray information 112) stored in the storage unit 103 to the currently-designated tray Ti.

Thereafter, the ejection control unit 108 determines whether the designated ejection destination is the "same as previous tray" (S201). When the designated ejection destination is the "same as previous tray" (YES in S201), the ejection control unit 108 sets the previous ejection tray Top (the ejection tray information) stored in the storage unit 103 to the current ejection tray To (S202).

If the designated ejection destination is not the "same as previous tray" (NO in S201), the ejection control unit 108 determines whether the designated ejection destination is the "tray different from previous tray" (S203). When the designated ejection destination is the "tray different from previous tray" (YES in S203), the ejection control unit 108 determines whether an ejectable retrieval tray Tk retrieved from among target trays (the distribution trays 31 to 34) other than the currently-designated tray Ti (the previous ejection tray Top) is set to the current ejection tray To by the processing of S112 and subsequent steps (S114). If the designated ejection destination is not the "tray different from previous tray" (NO in S203), the processing of S103 and subsequent steps are executed.

According to the present embodiment, the user of the host terminals 13A and 13B selects the option of "same as previous tray" as the ejection destination. Accordingly, without designating a specific tray, the user of the host terminals 13A and 13B causes the current print job to belong to the same group as the previous print job, thus allowing the printed matter of the current print job to be ejected to the same tray as the printed matter of the previous print job. The user can also select the option of "tray different from previous tray". Accordingly, without designating a specific tray, the user causes the current print job to belong to a different group from the previous print job, thus allowing the printed matter of the current print job to be ejected to another tray different from the printed matter of the previous print job.

Third Embodiment

Figure 11:
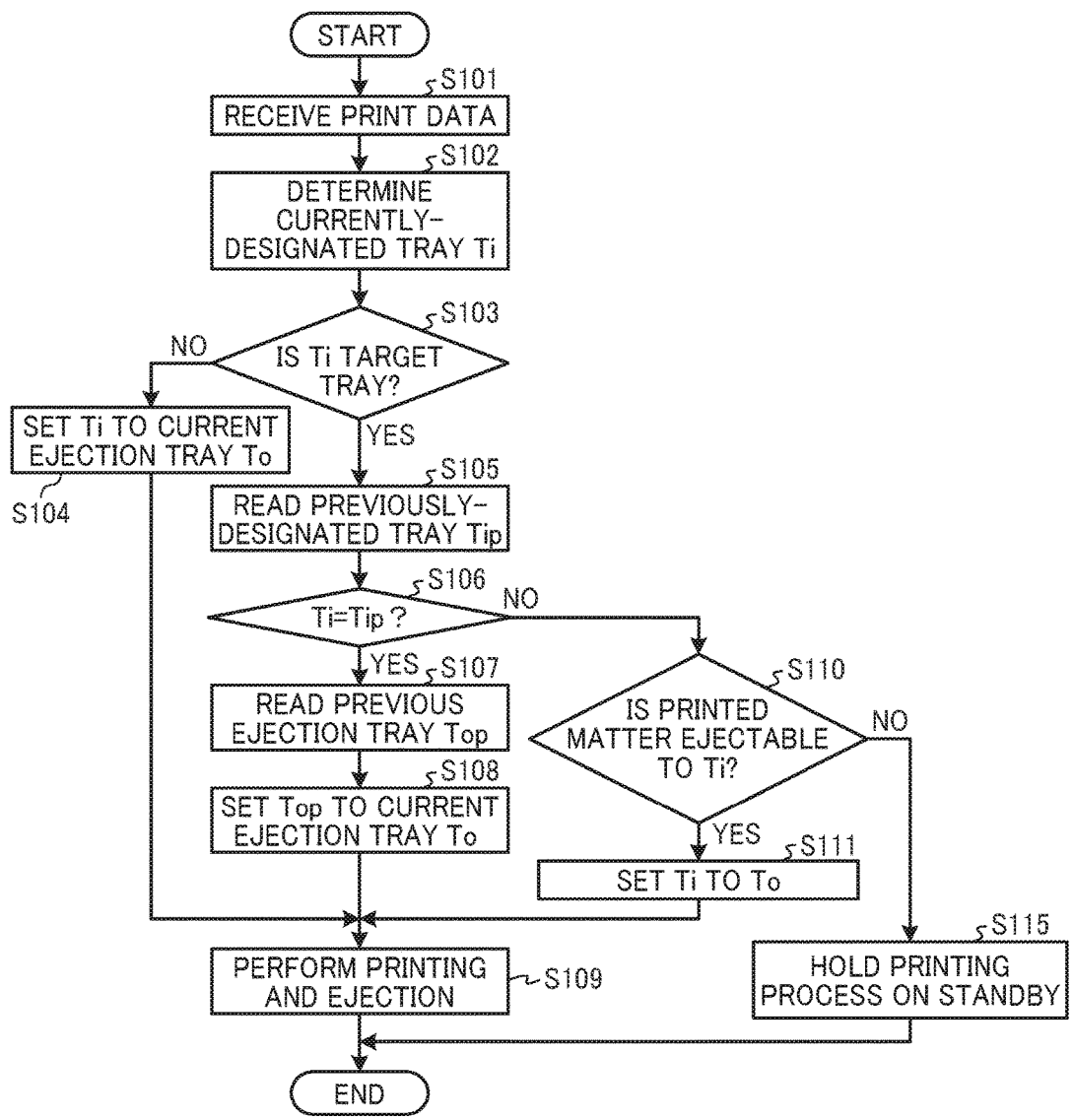
FIG. 11 is a flowchart illustrating a flow of a printed-matter ejection process in the image forming apparatus according to a third embodiment of the present disclosure.

FIG. 11 is a flowchart illustrating a flow of an ejection process of a printed matter in the image forming apparatus 11 according to a third embodiment of the present disclosure. The ejection process according to the present embodiment differs from the ejection process according to the first embodiment illustrated in FIG. 6 in that the ejection process according to the present embodiment do not include steps S112 to S114. Differences from the ejection process according to the first embodiment illustrated in FIG. 6 are described below.

When the ejection control unit 108 of the image forming apparatus 11 determines that a printed matter is not ejectable to the currently-designated tray Ti in step S110 (NO in S110), in step 5115, the ejection control unit 108 causes the printing process to stand by without performing a process of searching for an ejectable tray as in the first embodiment (S112 to S114). That is, when the currently-designated tray Ti is in an unprintable state, for example, the printed matter remains in the currently-designated tray Ti or the currently-designated tray Ti is already set to the current ejection tray To in another print job, the printing process stands by until the currently-designated tray Ti is ready to be ejected.

According to the present embodiment, it is possible to prevent the printed matter from being ejected to a tray other than a tray intended by the user.

Fourth Embodiment

FIG. 12 is a diagram illustrating a setting screen 301 of the image forming apparatus 11 according to a fourth embodiment of the present disclosure. The setting screen 301 is displayed on the display unit 104 (the operation panel 51) of the image forming apparatus 11 and is an example of an input screen to perform various settings regarding the image forming apparatus 11. On the setting screen 301, an operation unit to switch the ejection mode is provided. The ejection mode specifies a method of ejecting a printed matter. In the present embodiment, "empty-tray ejection mode" and "designated-tray ejection mode" are switchable.

As in the first embodiment and the second embodiment, the "empty-tray ejection mode" is a mode in which, when the currently-designated tray Ti is not in ejectable state, a tray (empty tray) in ejectable state is retrieved to eject a printed matter to an empty tray. The "designated-tray ejection mode" is a mode in which, as in the third embodiment, when the currently-designated tray Ti is not in ejectable state, the printing process stands by without retrieving an empty tray until the currently-designated tray Ti is ready to be ejected. In the fourth embodiment, the ejection mode is switchable between the "empty-tray ejection mode" and the "designated-tray ejection mode". Note that the setting screen 301 is not limited to being displayed on the display unit 104 of the image forming apparatus 11. For example, the setting screen 301 may be displayed on the displays of the host terminals 13A and 13B to receive input operations by the user of the host terminals 13A and 13B.

Figure 13A:
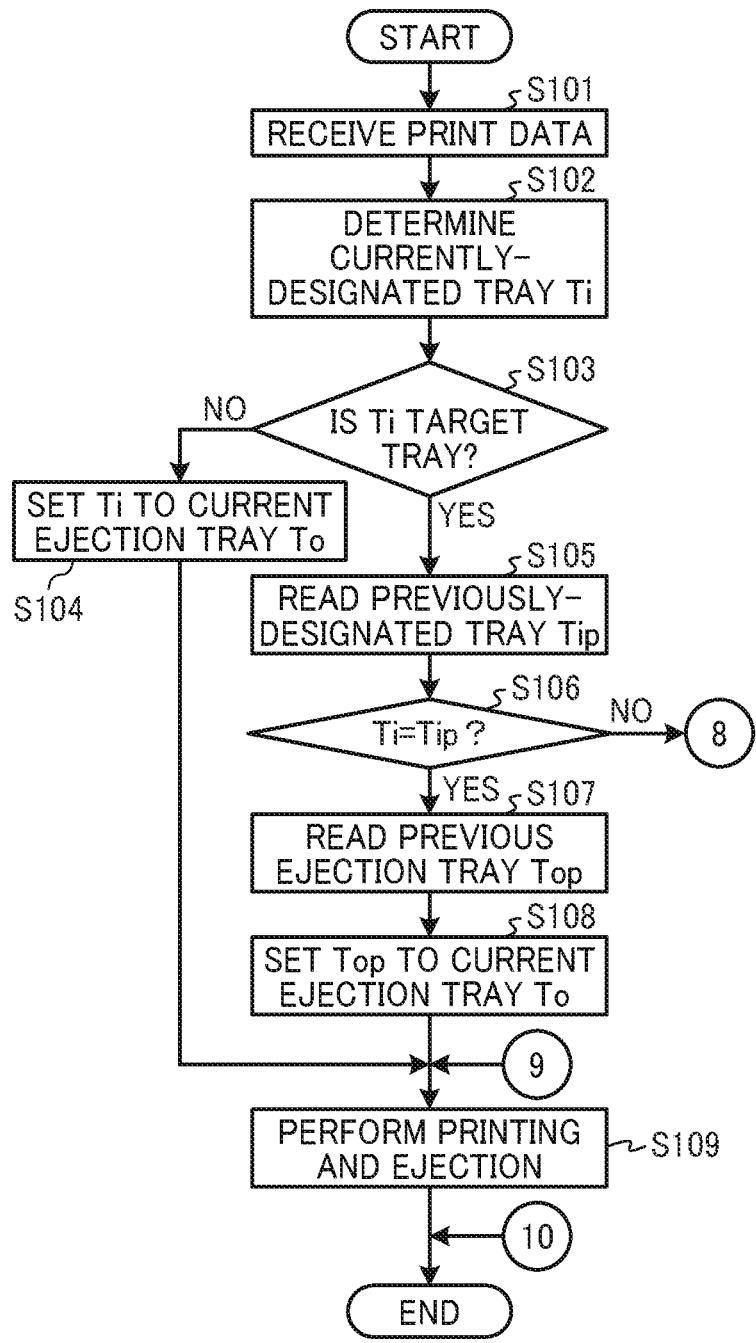
FIG. 13 (consisting of FIGS. 13A and 13B) is a flowchart illustrating a flow of a printed-matter ejection process in the image forming apparatus according to the fourth embodiment.
Figure 13B:
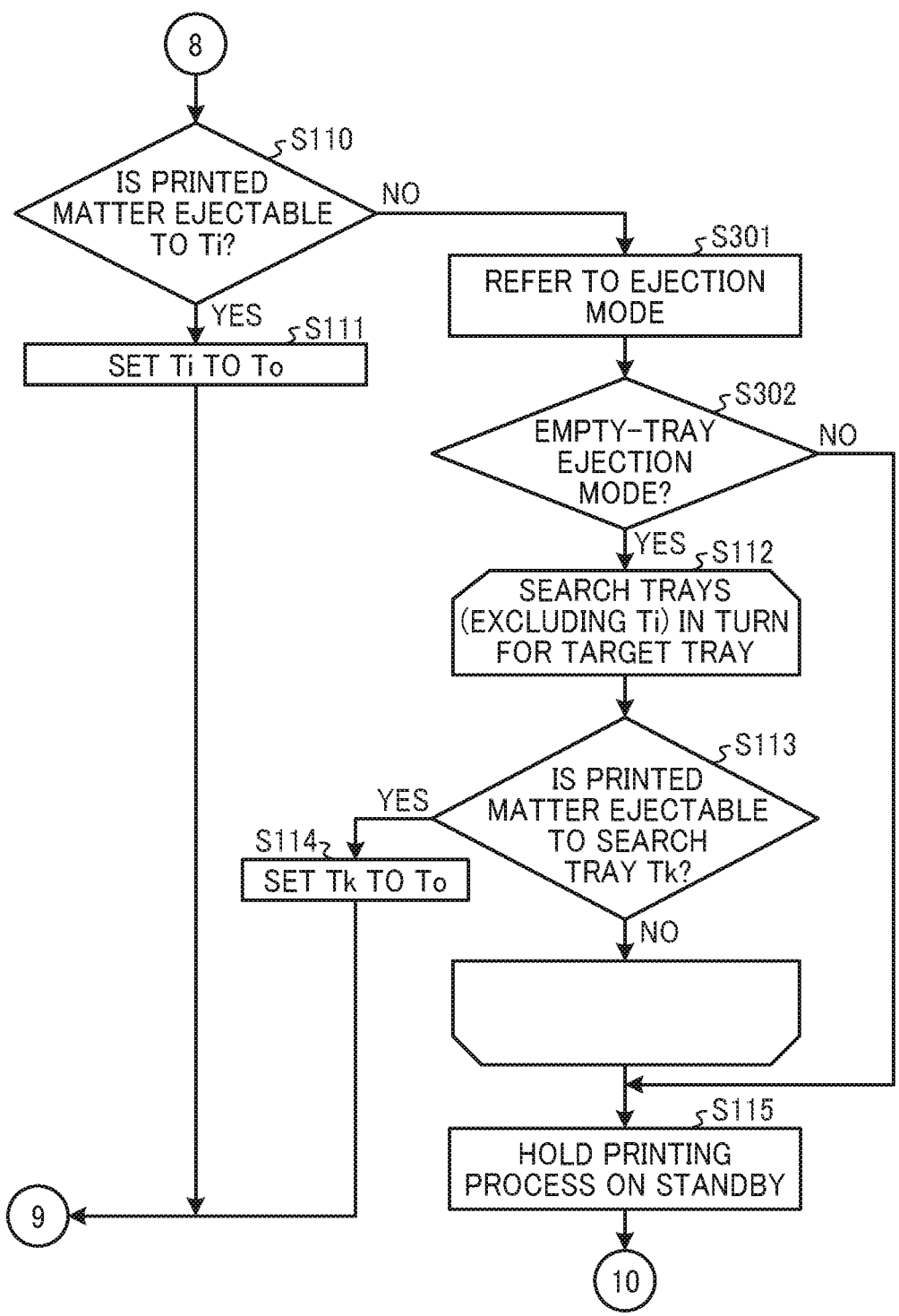

FIG. 13 (consisting of FIGS. 13A and 13B) is a flowchart illustrating a flow of an ejection process of a printed matter in the image forming apparatus 11 according to a fourth embodiment of the present disclosure. The ejection process according to the present embodiment differs from the ejection process according to the first embodiment illustrated in FIG. 6 in that the ejection process according to the present embodiment includes steps 5301 and 5302. Differences from the ejection process according to the first embodiment illustrated in FIG. 6 are described below.

When the ejection control unit 108 of the image forming apparatus 11 determines that a printed matter is not ejectable to the currently-designated tray Ti (NO in S110), the ejection control unit 108 refers to the ejection mode set by the user via an interface, such as the setting screen 301 illustrated in FIG. 12 (S301). When the ejection mode set by the user is the "empty-tray ejection mode" (YES in S302), the ejection control unit 108 searches for an empty tray and ejects the printed matter to the empty tray by the processing of step 5112 and subsequent steps. When the ejection mode set by the user is not the "empty-tray ejection mode" (NO in S302), that is, when the "designated-tray ejection mode" is set, the ejection control unit 108 causes the process to stand by without searching for the empty tray (S115).

According to the present embodiment, the user can select a mode (free tray ejection mode) in which, when a tray designated by the user is not in ejectable state, a printed matter is automatically ejected to another tray that is in ejectable state and a mode (designated-tray ejection mode) in which a printed matter is ejected only to the tray designated by the user. Such a configuration can greatly enhance the convenience.

Fifth Embodiment

Figure 14A:
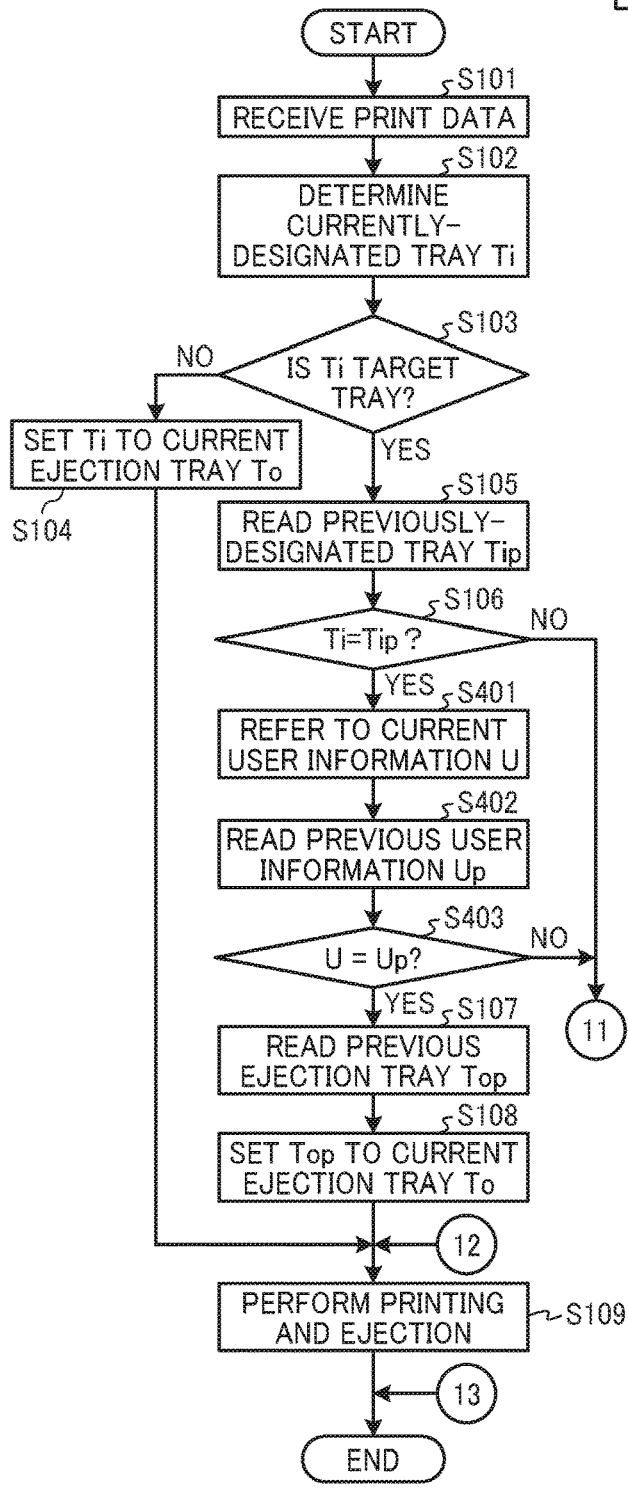
FIG. 14 (consisting of FIGS. 14A and 14B) is a flowchart illustrating a flow of a printed-matter ejection process in the image forming apparatus according to a fifth embodiment of the present disclosure.
Figure 14B:
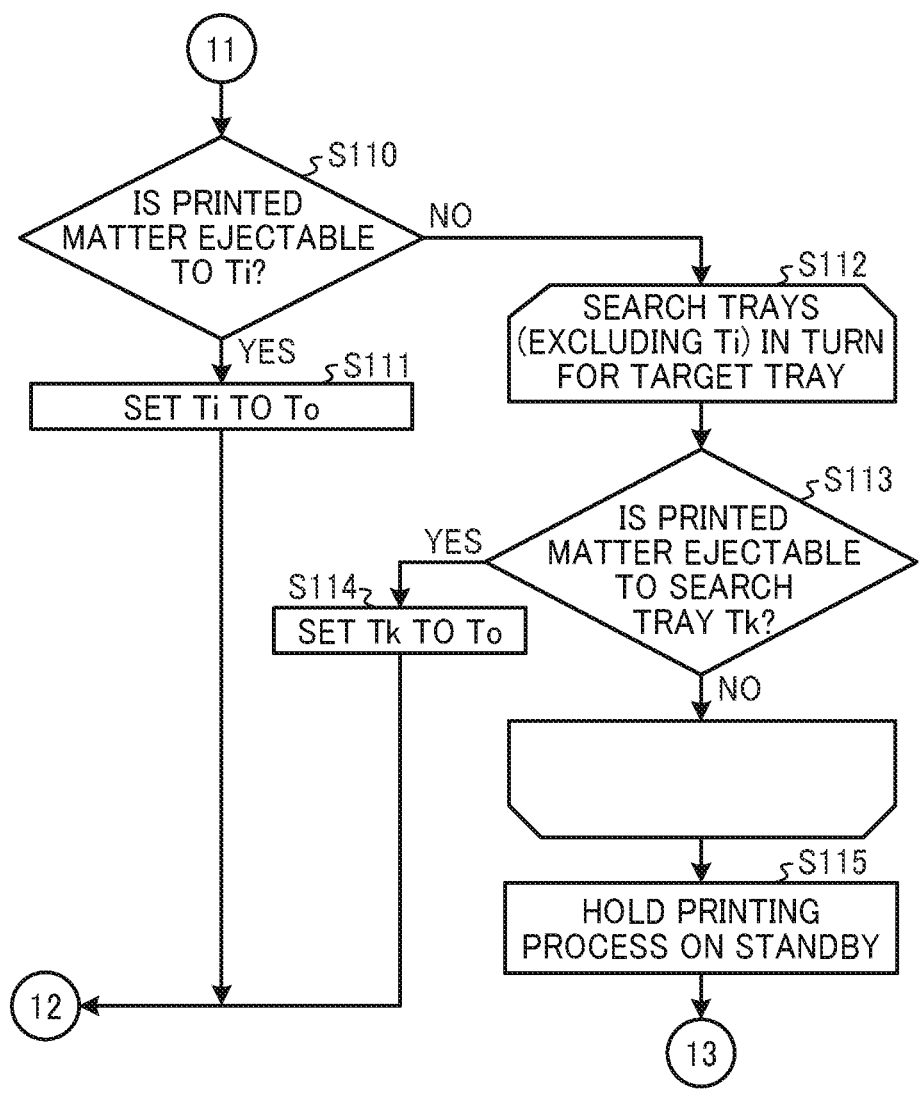

FIG. 14 (consisting of FIGS. 14A and 14B) is a flowchart illustrating a flow of an ejection process of a printed matter in the image forming apparatus 11 according to a fifth embodiment. The ejection control unit 108 (the group determination unit 121) according to any of the first to fourth embodiments performs grouping of a plurality of print jobs according to the continuity of ejection destinations. In the present embodiment, the ejection control unit 108 further performs grouping based on the user information. That is, even if the same ejection destination is continuously designated, the ejection control unit 108 according to the present embodiment does not handle a plurality of continuously-issued print jobs as the same group unless the user information matches. The ejection process according to the present embodiment illustrated in FIG. 14 differs from the ejection process according to the first embodiment illustrated in FIG. 6 in that the ejection process according to the present embodiment includes steps 5401 to 5403. Differences from the ejection process according to the first embodiment illustrated in FIG. 6 are described below.

The print data (print data received in step 5101) according to the present embodiment includes user information that specifies the user who operated the host terminals 13A and 13B (who issued the print job). When the currently-designated tray Ti matches the previously-designated tray Tip (YES in S106), the ejection control unit 108 of the image forming apparatus 11 refers to current user information U included in the received print data (S401) and reads previous user information Up (user information 113) stored in the storage unit 103 (S402). The current user information U is identification information identifying the user who issued the current print job, in other words, the user corresponding to the currently-designated tray Ti and the current ejection tray To. The previous user information Up is identification information identifying the user who issued the previous print job, in other words, the user corresponding to the previously-designated tray Tip and the previous ejection tray Top.

Thereafter, the ejection control unit 108 determines whether the current user information U matches the previous user information Up (S403). When the current user information U matches the previous user information Up (YES in S403), the ejection control unit 108 performs processing to set the previous ejection tray Top to the current ejection tray To by the process of step 5107 and subsequent steps. That is, the current print job and the previous print job are handled as the same group.

When the current user information U does not match the previous user information Up (NO in S403), the ejection control unit 108 executes the process of step S110 and subsequent steps. That is, the current print job and the previous print job are handled as different groups.

According to the present embodiment, it is possible to prevent a plurality of users' printed matters from mixing in one ejection tray.

Although some embodiments of the present disclosure have been described above, the above-described embodiments are presented as examples, and are not intended to limit the scope of the invention. The above-described embodiments can be implemented in various other forms, and various omissions, substitutions, changes, and combinations can be made without departing from the gist of the invention. Such embodiments and variations thereof are included in the scope and gist of the invention and are included in the invention described in claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
   circuitry configured to
      receive a first print job and ejection-destination designating information designating one of a plurality of ejection destinations as an ejection destination of a first printed matter based on the first print job;
      perform, based on the ejection-destination designating information, a determination of whether to eject the first printed matter to a previous ejection destination to which a second printed matter has been ejected based on a second print job received one before the first print job; and
      select the ejection destination of the first printed matter according to the determination; and
   a sensor to detect whether the ejection destination of the first printed matter is in an ejectable state,
   wherein the circuitry switches between a first mode and a second mode, the first mode permitting the ejection destination of the first printed matter designated by ejection-destination designating information to differ from a current ejection destination to which the first printed matter is to be ejected, and the second mode not permitting the ejection destination of the first printed matter designated by the ejection-destination designating information to differ from the current ejection destination to which the first printed matter is to be ejected,
   wherein, when the ejection destination of the first printed matter designated by the ejection-destination designing information is in an unejectable state and the first mode is executed, the circuitry sets another ejection destination in the ejectable state to the current ejection destination to which the first printed matter is to be ejected, and wherein, when the ejection destination of the first printed matter designated by the ejection-destination designing information is in the unejectable state and the second mode is executed, the circuitry controls a printing process to stand by until the ejection destination of the first printed matter designated by the ejection-destination designating information becomes in the ejectable state.

2. The image forming apparatus according to claim 1, further comprising a memory to store information indicating a previously-designated destination designated as an ejection destination of the second printed matter and information indicating the previous ejection destination to which the second printed matter has been ejected,
wherein, when a currently-designated destination designated as the ejection destination of the first printed matter matches the previously-designated destination, the circuitry sets the previous ejection destination to a current ejection destination to which the first printed matter is to be ejected.

3. The image forming apparatus according to claim 1, further comprising a memory to store information indicating a previously-designated destination designated as an ejection destination of the second printed matter and information indicating a previous user who has issued the second print job,
wherein, when a currently-designated destination designated as the ejection destination of the first printed matter matches the previously-designated destination and a user who has issued the first print job matches the previous user, the circuitry sets the previous ejection destination to a current ejection destination to which the first printed matter is to be ejected.

4. The image forming apparatus according to claim 1, wherein, when a printed matter remains in the ejection destination detected by the sensor or when the ejection destination detected by the sensor is already set as the current ejection destination to which the first printed matter is to be ejected, the sensor determines that the ejection destination detected by the sensor is in the unejectable state.

5. The image forming apparatus according to claim 1, wherein the plurality of ejection destinations includes target ejection destinations subjected to a distribution process to distribute a plurality of printed matters according to the determination of the circuitry and a non-target ejection destination not subjected to the distribution process.

6. The image forming apparatus according to claim 5, wherein the image forming apparatus is connected to a multi tray unit including a plurality of trays, and
wherein the target ejection destinations are at least two trays of the plurality of trays included in the multi tray unit.

7. The image forming apparatus according to claim 1, wherein the ejection-destination designating information is information selected from options including information designating one ejection destination from among the plurality of ejection destinations, information designating the previous ejection destination as a current ejection destination, and information designating another ejection destination different from the previous ejection destination as the current ejection destination.

8. An image forming system comprising:
an image forming apparatus to distribute and eject a plurality of printed matters to one or more of a plurality of ejection destinations; and
an information processing apparatus connected to the image forming apparatus through a network, the information processing apparatus including circuitry to generate ejection-destination designating information designating one of the plurality of ejection destinations as an ejection destination of a first printed matter based on a first print job,
the image forming apparatus including circuitry configured to
perform, based on the ejection-destination designating information, a determination of whether to eject the first printed matter to a previous ejection destination to which a second printed matter has been ejected based on a second print job received one before the first print job; and
select the ejection destination of the first printed matter according to the determination; and
a sensor to detect whether the ejection destination of the first printed matter is in an ejectable state,
wherein the circuitry switches between a first mode and a second mode, the first mode permitting the ejection destination of the first printed matter designated by ejection-destination designating information to differ from a current ejection destination to which the first printed matter is to be ejected, and the second mode not permitting the ejection destination of the first printed matter designated by the ejection-destination designating information to differ from the current ejection destination to which the first printed matter is to be ejected,
wherein, when the ejection destination of the first printed matter designated by the ejection-destination designing information is in an unejectable state and the first mode is executed, the circuitry sets another ejection destination in the ejectable state to the current ejection destination to which the first printed matter is to be ejected, and
wherein, when the ejection destination of the first printed matter designated by the ejection-destination designing information is in the unejectable state and the second mode is executed, the circuitry controls a printing process to stand by until the ejection destination of the first printed matter designated by the ejection-destination designating information becomes in the ejectable state.

9. An image forming method comprising:
receiving a first print job and ejection-destination designating information designating one of a plurality of ejection destinations as an ejection destination of a first printed matter based on the first print job;
performing, based on the ejection-destination designating information, a determination of whether to eject the first printed matter to a previous ejection destination to which a second printed matter has been ejected based on a second print job received one before the first print job;
selecting the ejection destination of the first printed matter according to the determination;
detecting whether the ejection destination of the first printed matter is in an ejectable state:
determining operation between one of a first mode and a second mode, the first mode permitting the ejection destination of the first printed matter designated by ejection-destination designating information to differ from a current ejection destination to which the first printed matter is to be ejected, and the second mode not permitting the ejection destination of the first printed matter designated by the ejection-destination designating information to differ from the current ejection destination to which the first printed matter is to be ejected;

when the ejection destination of the first printed matter designated by the ejection-destination designing information is in an unejectable state and the first mode is executed, setting another ejection destination in the ejectable state to the current ejection destination to which the first printed matter is to be ejected; and when the ejection destination of the first printed matter designated by the ejection-destination designing information is in the unejectable state and the second mode is executed, controlling a printing process to stand by until the ejection destination of the first printed matter designated by the ejection-destination designating information becomes in the ejectable state.

10. The image forming method of claim 9 further comprising:

storing, in memory, information indicating a previously-designated destination designated as an ejection destination of the second printed matter and information indicating the previous ejection destination to which the second printed matter has been ejected; and when a currently-designated destination designated as the ejection destination of the first printed matter matches the previously-designated destination, setting the previous ejection destination to a current ejection destination to which the first printed matter is to be ejected.

11. The image forming method of claim 9 further comprising:

storing, in memory, information indicating a previously-designated destination designated as an ejection destination of the second printed matter and information indicating a previous user who has issued the second print job; and when a currently-designated destination designated as the ejection destination of the first printed matter matches the previously-designated destination and a user who has issued the first print job matches the previous user, setting the previous ejection destination to a current ejection destination to which the first printed matter is to be ejected.

12. The image forming method of claim 9 further comprising:

when a printed matter remains in the ejection destination that is detected or when the ejection destination that is detected is already set as the current ejection destination to which the first printed matter is to be ejected, determining that the ejection destination that is detected is in the unejectable state.

13. The image forming method of claim 9, wherein the plurality of ejection destinations includes target ejection destinations subjected to a distribution process to distribute a plurality of printed matters according to the determination and a non-target ejection destination not subjected to the distribution process.

14. The image forming method of claim 13, wherein the target ejection destinations include at least two trays of a multi tray unit.

15. The image forming method of claim 9, wherein the ejection-destination designating information is information selected from options including information designating one ejection destination from among the plurality of ejection destinations, information designating the previous ejection destination as a current ejection destination, and information designating another ejection destination different from the previous ejection destination as the current ejection destination.

* * * * *